United States Patent
Tsuchiya

(10) Patent No.: US 8,252,457 B2
(45) Date of Patent: Aug. 28, 2012

(54) BATTERY CELL AND POWER SUPPLY

(75) Inventor: Kenji Tsuchiya, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 285 days.

(21) Appl. No.: 12/663,580

(22) PCT Filed: Jun. 12, 2008

(86) PCT No.: PCT/IB2008/001511
§ 371 (c)(1),
(2), (4) Date: Dec. 8, 2009

(87) PCT Pub. No.: WO2008/152482
PCT Pub. Date: Dec. 18, 2008

(65) Prior Publication Data
US 2010/0173190 A1      Jul. 8, 2010

(30) Foreign Application Priority Data
Jun. 13, 2007   (JP) ................................. 2007-156075

(51) Int. Cl.
*H01M 2/24* (2006.01)
(52) U.S. Cl. ......... 429/181; 429/178; 429/163; 429/179
(58) Field of Classification Search .................. 429/181, 429/163, 178
See application file for complete search history.

(56) References Cited

U.S. PATENT DOCUMENTS

| | | |
|---|---|---|
| 6,399,244 B1 | 6/2002 | Hinotu et al. |
| 2005/0118501 A1* | 6/2005 | Hashimoto et al. ........... 429/180 |
| 2006/0115727 A1* | 6/2006 | Kim et al. ..................... 429/181 |
| 2006/0216593 A1 | 9/2006 | Jung et al. |

FOREIGN PATENT DOCUMENTS

| | | |
|---|---|---|
| CN | 1838466 | 9/2006 |
| EP | 0 867 954 A1 | 9/1998 |
| JP | 2005-339925 | 12/2005 |
| JP | 2005-339990 | 12/2005 |
| KR | 10-2001-0030550 | 4/2001 |

OTHER PUBLICATIONS

Notification of Reason(s) for Refusal for KR Appl. No. 10-2009-7025751 dated May 3, 2011.
First Office Action for Chinese Patent Appl. No. 200880019457.X dated Sep. 15, 2011.

* cited by examiner

*Primary Examiner* — Jane Rhee
(74) *Attorney, Agent, or Firm* — Finnegan, Henderson, Farabow, Garrett & Dunner, LLP

(57) ABSTRACT

A battery (2) includes an insulating member (40) fitted into a hole (26) in a case (20), and electrode terminals (60, 70), each being passed through the insulating member (40) and extended out of the case (20). The insulating member (40) includes: a first insulating portion (42) that isolates each of the electrode terminals (60, 70) from the inner surface of the hole (26) and closes the interface between each of the electrode terminals (60, 70) and the inner surface; and a second insulating portion (48) formed along the surface of each of the terminals (60, 70) at the outer end portion of the insulating member (40).

17 Claims, 4 Drawing Sheets

BATTERY CELL AND POWER SUPPLY

CROSS-REFERENCE TO RELATED APPLICATIONS

This application is a national phase application of International Application No. PCT/IB2008/001511, filed Jun. 12, 2008, and claims the priority of Japanese Application No. 2007-156075, filed Jun. 13, 2007, the contents of both of which are incorporated herein by reference.

BACKGROUND OF THE INVENTION

1. Field of the Invention

The invention relates to a battery cell and a power supply that is formed by welding metallic members to terminals of the battery cells.

2. Description of the Related Art

A battery cell is available in which one end of an electrode terminal is connected to an electrode unit contained in a case, and the other end of the terminal is passed through a hole formed in the case and is extended to the outside. In a battery cell with such a configuration, as described in Japanese. Patent Application Publication No. 2005-339990 (JP-A-2005-339990) for example, a resin member (insulating member) is disposed in the hole to isolate the terminal from the case.

Battery cells with such a configuration are in some cases used in a form in which another member (metallic member, for example) is welded to the electrode terminal. For example, as a power supply or a component thereof that is mounted on a vehicle as a power source or the like of the vehicle, a battery pack can be used in which a plurality of battery cells (unit cells; typically, secondary batteries, such as lithium-ion secondary batteries) are connected in series or in parallel. An example of the method of connecting a plurality of unit cells is a method, described in Japanese Patent Application Publication No. 2005-339925 (JP-A-2005-339925) for example, in which a connection member (bus bar) is welded to an electrode terminal of a unit cell. Another member is in some cases welded to the electrode terminal to connect a battery cell and an external circuit.

However, when another member is welded to the electrode terminal in this way, the resin member can melt due to increase in temperature of the resin member caused by the heat applied during welding. When the melt of the resin member progresses too much, it may become a cause of problems, such as defective insulation between the electrode terminal and the case, and defective sealing in the case.

SUMMARY OF THE INVENTION

The invention provides a battery cell in which an electrode terminal is passed through a resin member and is extended out of a case, and in which the occurrence of either defective insulation between the electrode terminal and the case or defective sealing in the case, or the like, due to welding of the electrode terminal is prevented. The invention also provides a power supply constructed by welding a metallic member to an electrode terminal of the battery cell.

According to a first aspect of the invention, a battery cell is provided in which an electrode unit is contained in a case having a hole. The battery cell includes an insulating member fitted into the hole. The battery cell further includes an electrode terminal that is connected to the electrode unit and is passed through the insulating member and extended out of the case through the hole. The electrode terminal has an exposed portion that is further extended out of the insulating member outside the case. The insulating member includes: a first insulating portion interposed between the electrode terminal and the hole; and a second insulating portion formed along a surface of the electrode terminal that is extended out of the case through the hole.

The first insulating portion may isolate the electrode terminal from an inner surface of the hole and close an interface between the inner surface and the electrode terminal.

According to the battery cell with such a configuration, when the heat applied during welding of the exposed portion is transmitted to the insulating portion, the second insulating portion is first melted by the welding heat (heat transfer through the electrode terminal, for example), so that it is possible to suppress the increase in temperature of the first insulating portion that forms the portion on the hole side of the second insulating portion. Thus, when the second insulating portion is prepared as the "melting portion" that absorbs the heat supplied during the welding and melts, it is possible to suppress the increase in temperature of the portion other than the second insulating portion. Thus, melt of the portion of the insulating member positioned on the hole side of the second insulating portion is avoided, and it is therefore possible to suppress the defective sealing in the case and the defective insulation between the case and the electrode terminal. Thus, the battery cell according to the invention is capable of stably achieving a certain sealing performance, such as the capability of preventing fluidic electrolyte from leaking and water from entering the case, and a certain insulating performance. Accordingly, such a battery cell can be used as a component of a power supply constructed by welding a metallic member to the exposed portion.

The term "battery cell" in this specification generally represents an electricity storage device from which electric energy can be retrieved, and conceptually includes secondary batteries (storage batteries, such as lithium-ion batteries, metal-lithium ion secondary batteries, nickel-hydrogen batteries and nickel-cadmium batteries, and electricity storage devices, such as electric double-layer capacitors), and primary batteries.

The insulating member may further include a third insulating portion that is provided between the first insulating portion and the second insulating portion. In addition, a recess may be formed in a top surface of the third insulating portion.

The recess may be formed along the outer periphery of the top surface of the third insulating portion, and the recess may prevent outflow of a melt of the second insulating portion when the second insulating portion melts.

The recess may be formed so as to have a volume equal to or greater than the volume of the second insulating portion.

The second and third insulating portions may be integrally formed.

Of members constituting the case, at least a member in which the hole is formed may be made of metal.

At least a portion of the electrode terminal from a portion passed through the insulating member to the exposed portion may be made of copper. The term "made of copper" means that the portion is substantially made of copper or copper-based alloy (copper alloy).

The insulating member may contain a resin selected from a group consisting of polyphenylene sulfide (PPS), polyimide, polyamideimide, fluoroplastic, polyetheretherketone (PEEK), and polyethersulfone (PES).

The insulating member may be made of a resin whose melting point is equal to or greater than 200° C.

A second aspect of the invention is a power supply constructed using a plurality of the battery cells, the power supply being formed by welding a metallic member to the exposed portion. Because the occurrence of either defective insulation between the electrode terminal and the case or defective sealing due to the heat applied during welding is prevented as described above, it is possible to more stably achieve certain sealing performance and insulating performance. Thus, it is possible to achieve more excellent quality stability with the power supply constructed using the battery cells.

The plurality of battery cells, may be electrically connected by welding one end and the other end of the metallic member to respective electrode terminals of adjacent two of the plurality of battery cells.

The volume of the second insulating portion may be set based on the distance from a welded portion between the exposed portion and the metallic member to the top end of the second insulating portion and on the volume of a welded object that is melted to perform welding.

A third aspect of the invention is a vehicle provided with the above-described power supply.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
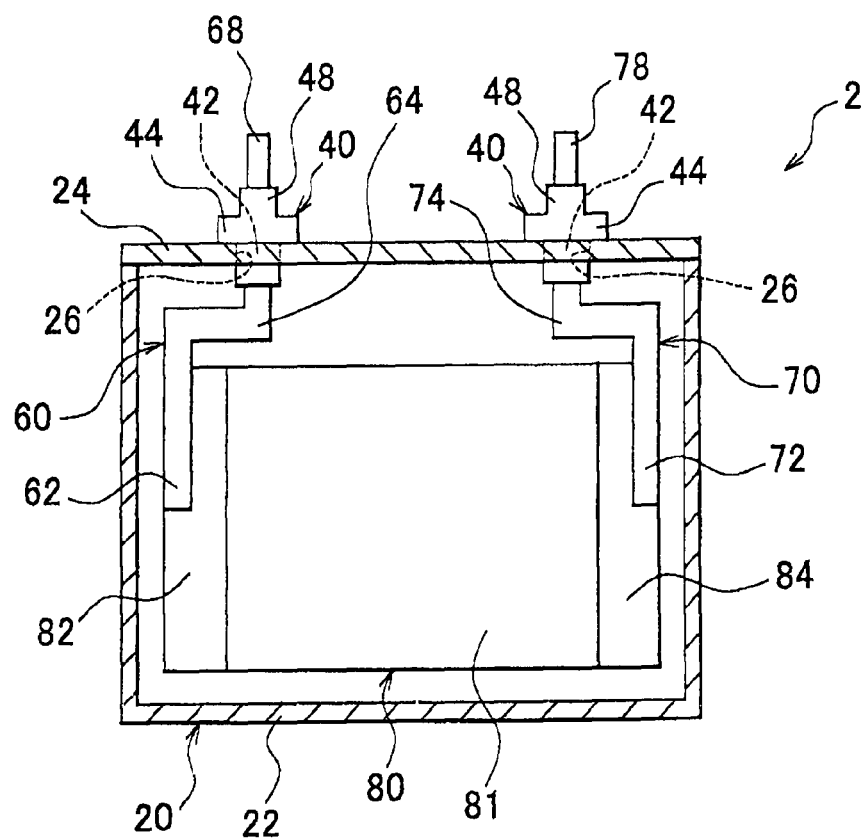
FIG. 1 is a sectional view showing a battery cell according to an embodiment.

An embodiment of the invention, in which the invention is applied to a lithium-ion battery cell and a battery pack that is constructed using the lithium-ion battery cells, will be specifically described with reference to drawings by way of example. In the following description related to the drawings, the members and portions that have the same function are designated by the same reference numerals, and repetitive description will be omitted in some cases.

The lithium-ion battery cell according to this embodiment, similar to typical lithium-ion battery cells except the form of resin members described later, includes: an electrode unit having typical battery components (that is, active materials of positive and negative electrodes, positive and negative current collectors, separators, etc.); a case that contains the electrode unit and appropriate electrolyte; and positive and negative terminals (electrode terminals), one end, that is, the electrode-unit side end, of each of which is connected to the electrode unit, and the other end of each of which is extended out of the case.

As an example, the lithium-ion battery 2 shown in FIG. 1 includes: a compressed electrode unit 80, which is obtained by layering a sheet-like positive electrode (hereinafter, referred to as the "positive sheet") 82 and a sheet-like negative electrode (hereinafter, referred to as the "negative sheet") 84 and two sheet-like separators (hereinafter referred to as the "separator sheets") and rolling up the layered sheet; a case 20 that contains the electrode unit 80; and a positive terminal 60 and a negative terminal 70, one end, that is, the electrode-unit side end, of each of which is connected to the electrode unit 80, and the other end (outer end) of each of which is passed through a resin member 40, described later, and is extended out of the case 20.

The case 20 includes: a rectangular holder member 22, one end (the face positioned at the top in FIG. 1) of which is open; and a lid member 24 that is attached so as to close the open end. The lid member 24 is provided with two holes 26 that are used to allow the other ends (outer ends) of the positive and negative terminals 60 and 70 to be extended out of the case. Each of the holder member 22 and the lid member 24 is typically made of metallic material, such as aluminum. The box-shaped case 20 is constructed by joining the lid member 24 with the holder member 22 at the open end by welding, for example.

Figure 2:
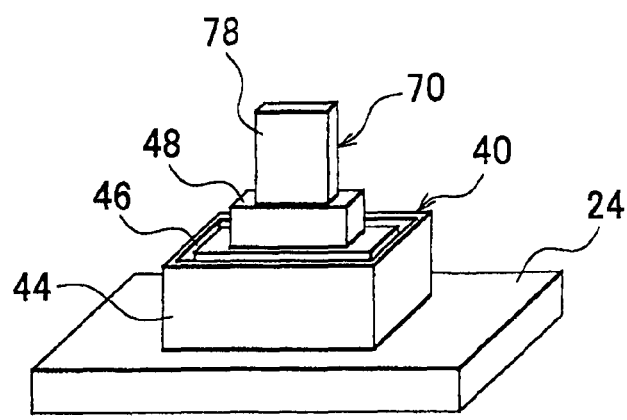
FIG. 2 is an explanatory diagram showing a main portion of the battery cell according to the embodiment.
Figure 3:
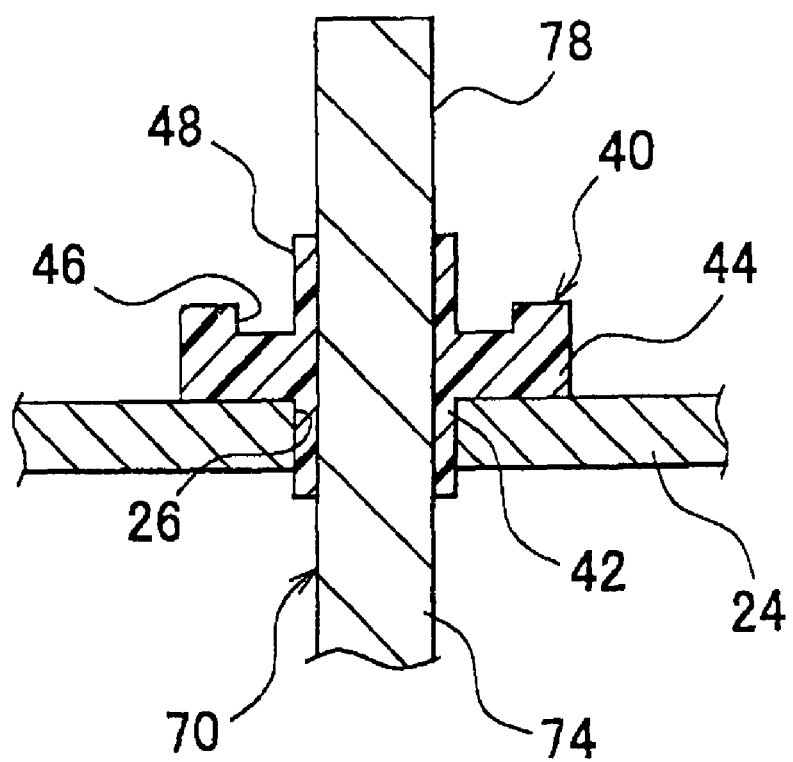
FIG. 3 is a sectional view showing a main portion of a battery cell according to a modification.

The resin member 40 made of polyphenylene sulfide (PPS), for example, is fitted, as an insulating member, onto each of the positive and negative terminals 60 and 70. The resin member 40 has a spacer portion 42, a protruding portion 44, and a thin-walled portion 48, in this order from the inner side. The thin-walled portion 48 and the spacer portion 42 are formed in a cylindrical shape extending upward and downward, respectively, along the surface of each of the terminals 60 and 70 from center portions of the upper surface and the lower surface of the substantially plate-like protruding portion 44, which is provided between the spacer portion 42 and the thin-walled portion 48. The resin member 40 is fitted into the hole 26 by inserting the spacer portion 42 into the hole 26 from the outer side of the lid member 24. In addition, the spacer portion 42 (resin member 40) is interposed between the inner surface of the hole 26 and each of the terminals 60 and 70, so that the lid member 24 is electrically insulated from the terminals 60 and 70, and the interface between the hole 26 and each of the terminals 60 and 70 is sealed to prevent the foreign matter, such as water, from entering. The spacer portion 42, the thin-walled portion 48, and the protruding portion 44 may be regarded as the "first insulating portion", the "second insulating portion", and the "third insulating portion" of the invention, respectively Specifically, as shown in FIG. 2, the upper surface (the end face on the thin-walled portion 48 side) of the protruding portion 44 is provided with an annular groove (recess) 46 along the periphery of the protruding portion 44. The annular groove 46 may be formed slightly spaced apart from the portion (the base portion of the thin-walled portion 48) from which the thin-walled portion 48 extends, as shown in FIG. 2. Alternatively, the annular groove 46 may be formed directly adjacent to the base portion of the thin-walled portion 48 as shown in FIG. 3, for example. The shape of the resin member 40 may be set so that the volume of the annular groove 46 is substantially equal to or greater than (substantially equal to, for example) the volume of the thin-walled portion 48. The resin member 40 fitted onto the negative terminal 70 is shown in FIGS. 2 and 3. The resin member 40 fitted onto the positive terminal 60 may have a shape similar to the former resin member 40.

As shown in FIG. 1, connection portions 62 and 72 provided in the one end side, that is, the electrode-unit side, of the positive and negative terminals 60 and 70 are connected to the positive sheet 82 and the negative sheet 84 by welding, for example. Each of the terminals 60 and 70 is passed through the resin member 40 fitted into the hole 26, and is extended out of the case 20. Each of exposed portions 68 and 78, which is provided in the other side (outer side) of the terminals 60 and 70, is further extended out of the resin member 40 (thin-walled portion 48) and exposed to the outside. The connection portions 62 and 72 and the exposed portions 68 and 78 are connected through lead portions 64 and 74. Each of the positive terminal 60 and the negative terminal 70 may be an integrally formed member, such as a metallic member, or may be a terminal constructed by joining a plurality of members. Material similar to that for common lithium-ion batteries may be used as the material for the terminals 60 and 70 without particular limitations. For example, aluminum and copper may be selected as the material for the positive and negative terminals 60 and 70, respectively.

Figure 4:
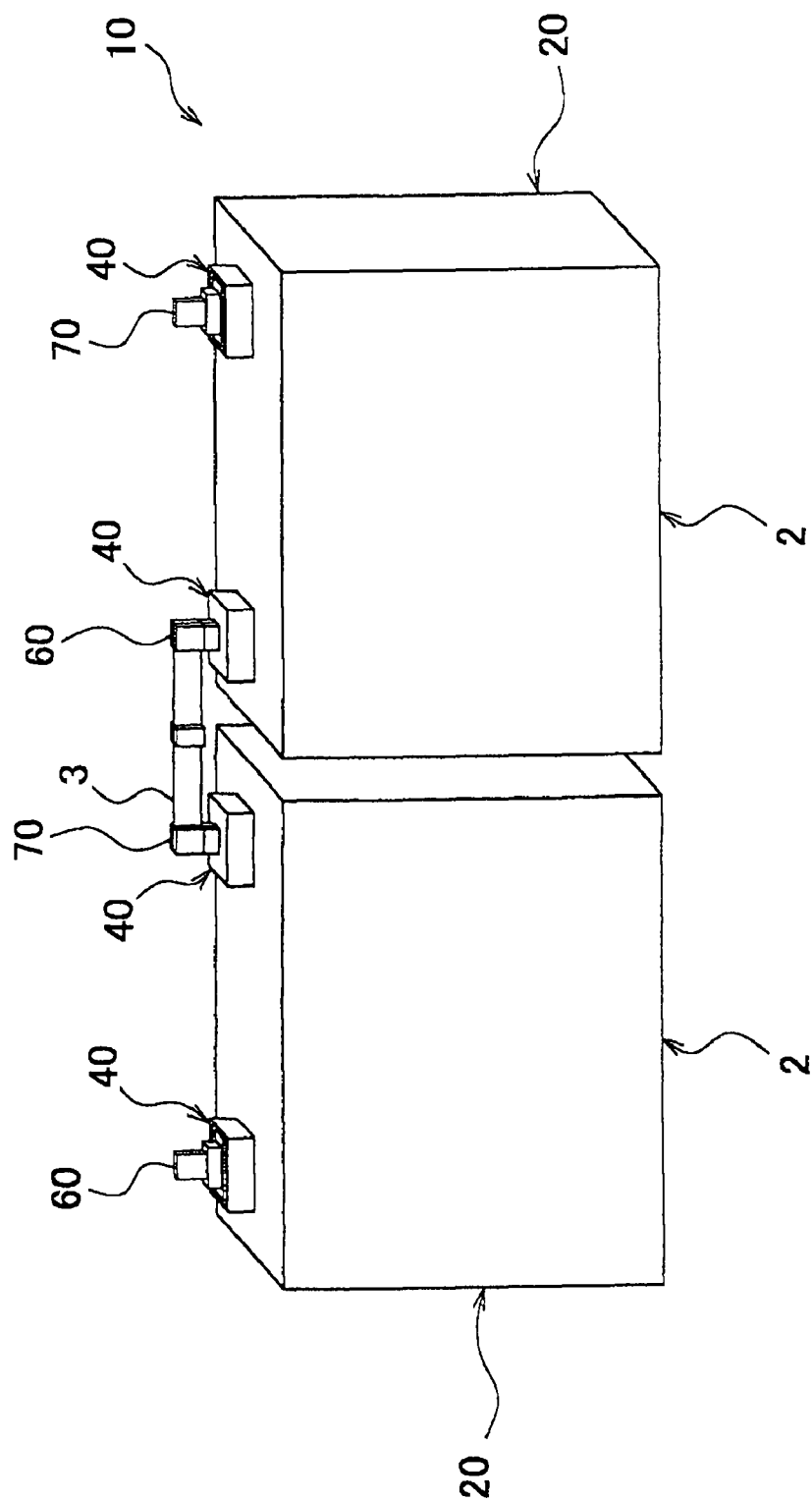
FIG. 4 is an explanatory diagram showing a battery pack formed by welding a metallic member to electrode terminals.

As shown in FIG. 4, the cell 2 with such a configuration is used in the form of, for example, a battery pack 10, in which a plurality of the cells (unit cells) 2 are arranged in an array and electrically connected in series by welding one end and the other end of the metallic bus bar 3, as a connecting member, to the positive and negative terminals 60 and 70 of the adjacent cells 2, respectively. A highly conductive metallic material, such as copper and aluminum, can be used as the material for the bus bar 3. For example, an end (negative-electrode side end portion) that is welded to the negative terminal 70 is made of a material the same as that for the negative terminal 70, such as copper, and an end (positive-electrode side end portion) that is welded to the positive terminal 60 is made of a material the same as that for the positive terminal 60, such as aluminum. A form may be adopted in which the negative-electrode side end portion and the positive-electrode side end portion of the bus bars 3 are joined at a middle point. As the method of welding the bus bars 3 and the terminals 60 and 70, common metal welding methods, which include arc welding, such as tungsten inert gas (TIG) welding, metal inert gas (MIG) welding and plasma welding, laser welding, and electron beam welding, can be used according to the circumstances.

Referring to FIGS. 2 to 5, functions of the resin member 40 will be described with respect to the case where the bus bar 3 is welded to the negative terminal 70, by way of example. When one end of the bus bar 3 is welded to the exposed portion 78 of the negative terminal 70 by a TIG welding machine 4, for example, the welding heat that is supplied from the welding machine 4 to the welded portion (exposed portion 78) is transmitted to the inner side (lower portion in FIG. 5) of the negative terminal 70. When the resin member 40 is heated to a temperature higher than the melting point thereof due to the heat transfer, the heated portion of the resin member 40 melts. However, because the thin-walled portion 48 is provided in the outer end portion (end portion on the exposed portion 78 side) of the resin member 40 before the bus bar 3 is welded to the negative terminal 70 (see FIGS. 2 and 3), the thin-walled portion 48 is first melted due to the heat transfer from the welded portion, whereby increase in temperature of the portion of the resin member 40 positioned lower than the thin-walled portion 48 is suppressed. The thin-walled portion 48 functions as a "melting portion" that is used against the welding heat, whereby other portions (the protruding portion 44 and the spacer portion 42) are restrained from melting. Thus, it is possible to more surely prevent the occurrence of defective sealing and/or defective insulation between the terminal 70 and the lid member 24 in the battery cell 2 obtained after welding (the unit cell 2, which is a component of the battery pack 10, made through the welding). Thus, advantageous effects, such as improvement in the efficiency of manufacturing battery packs 10 (the reduction in percent defective, for example), improvement in the quality stability, etc. are achieved.

In addition, the thin-walled portion 48 that is melted due to the welding heat (the melt of the resin material of which the thin-walled portion was made) is collected in the annular groove 46 provided in the upper surface portion of the protruding portion 44, is cooled and solidified, and forms the resin member 40 that is integral with other portions (the protruding portion 44 and the spacer portion 42). Thus, it is possible to effectively use the resin material of which the thin-walled portion 48 is made before welding, as the material for the resin member 40 in the battery cell 2 even after the welding. In addition, the melted resin is prevented from flowing out of the resin member 40 as described above, so that it is possible to avoid the problem that the melted resin adheres to a portion to which resin is not supposed to adhere and impairs the external appearance of the battery, for example.

The amount of resin that forms the thin-walled portion 48 (the volume of the thin-walled portion 48) and the shape of the thin-walled portion 48 may be set in consideration of the configuration of and the material for the battery pack 10, such as the distance from the welded portion between the negative terminal 70 and the bus bar 3 to the top end of the thin-walled portion 48, the material for the negative terminal 70, the thickness of the negative terminal 70, and the material for the resin member 40, welding conditions, such as the welding method, welding time, and the volume of the welded object that is melted for welding, etc. For example, the configuration and the volume of the thin-walled portion 48 may be set so that just the entire thin-walled portion 48 is melted during welding. In this way, it is possible to achieve the advantageous effects of the invention without unnecessarily increasing the length of protrusion of the terminal 70 from the case 20 (that is, with the increase in the space occupied by the battery cell 2 or the battery pack 10 minimized). Although there is no particular limitation, the volume of the thin-walled portion 48 may be about one to ten times as large as the volume of copper that is melted to perform welding, such as TIG welding, when the negative terminal 70 is made of copper, the resin member 40 is made of polyphenylene sulfide (PPS), and the distance between the welded portion and the upper end (the welded-portion side end) of the thin-walled portion 48 is about 5 to 10 mm.

Figure 5:
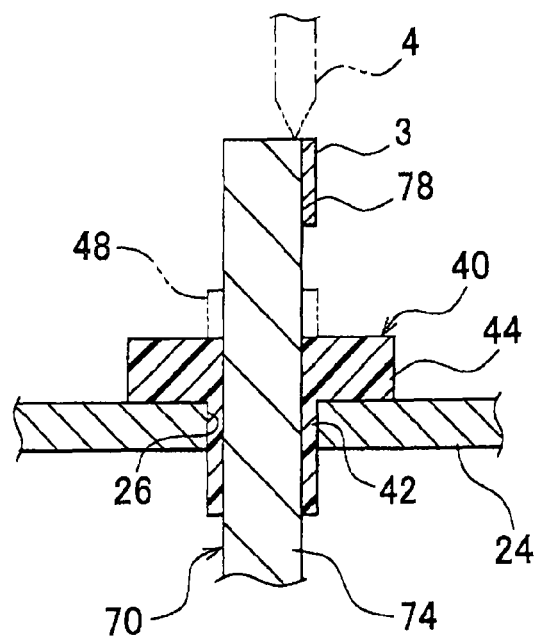
FIG. 5 is a sectional view showing a state in which the metallic member is welded to the electrode terminal.

FIG. 5 illustrates an example in which the resin member 40 is formed so that the volume of the thin-walled portion 48 and the volume of the annular groove 46 are substantially equal to each other before welding, and just the entire thin-walled portion 48 is melted due to welding to cause the annular groove 46 to be just filled with the melt of the thin-walled portion 48 in the resin member 40 after welding (in a state shown in FIG. 5). After the resin material of which the thin-walled portion 48 is made is transferred into the annular groove 46 in this way, the upper surface of the protruding portion 44 is flat and there is no unnecessary protrusion in the resin member 40 after welding, as shown in FIG. 5.

As the resin material of which the resin member 40 is made, a material that is electrically insulating and is highly resistant to electrolyte, such as electrolytic solution, may be used. For example, polyimide resin, polyamideimide resin, fluoroplastic, polyetheretherketone resin (PEEK), polyethersulfone resin (PES), or the like may be used in addition to the above-mentioned PPS. It is preferable that a resin material whose withstand temperature (melting point) is about 150° C. or more (more preferably, about 200° C. or more) be used. In this embodiment, PPS, whose melting point is about 280° C., is taken as an example of resin material. Manufacturing (forming) of the resin member 40 having a predetermined shape with the use of such resin material can be performed in a way similar to that of common resin member manufacturing methods, and is not particularly characteristic of the invention, and for this reason, detailed description thereof is omitted.

Referring back to FIG. 1, further description of a configuration and used material of the battery cell 2 according to this embodiment will be given below. Metallic material, such as aluminum, steel and stainless steel, similar to those used in common lithium-ion batteries may be used as the material for the holder member 22 and the lid member 24, which constitute the case 20. Alternatively, the holder member 22 may be made of resin, and the lid member 24 may be made of metallic material, for example. The technologies described herein may be applied to a battery cell 2, in which the entire case 20 (the holder member 22 and the lid member 24) is made of resin.

The electrode unit 80 contained in the case 20 is formed by alternately layering the positive sheet 82 having a positive electrode active material layer on an elongated sheet-like positive current collector, a separator sheet, the negative sheet 84 having a negative electrode active material layer on an elongated sheet-like negative current collector, and a separator sheet, and then rolling up the layered sheet in the longitudinal direction. A portion (no active-material-layer formed portion) on which there is no active material layer and at which the current collector is therefore exposed is provided at one side extending along the longitudinal direction of each of the positive sheet 82 and the negative sheet 84. When the positive and negative sheets 82 and 84 and the two separator sheets are layered, the positive and negative sheets 82 and 84 are slightly offset from each other in the width direction (the direction along the axis of the roll) so that the positive and negative electrode active material layers overlap each other and the no active-material-layer formed portion of the positive sheet 82 and the no active-material-layer formed portion of the negative sheet 84 are separately located on one side and the other side, respectively, extending along the longitudinal direction of the sheets. These four sheets are rolled up, and the obtained roll is then pressed and deformed in the lateral direction to obtain the compressed electrode unit 80.

As a result of rolling up the sheets with the slight offset in the width direction as described above, the center portion of the electrode unit 80 in the axial direction becomes a roll core portion 81 in which the positive-electrode active-material formed portion of the positive sheet 82 and the negative-electrode active-material formed portion of the negative sheet 84 and the separator sheets are densely rolled up. On the other hand, at one side of the electrode unit 80 (the left side in FIG. 1), the no active-material-layer formed portion of the positive sheet 82, that is, the positive current collector, is exposed from the roll core portion 81 to the outside. The exposed portion is gathered in the thickness direction of the compressed electrode unit 80, and the connection portion 62 of the positive terminal 60 is connected to this gathered, exposed portion (by welding, for example). Similarly, the no active-material-layer formed portion of the negative sheet 84, that is, the negative current collector, which is exposed from the roll core portion 81 to the outside on the other side in the axial direction of the electrode unit 80, is gathered, and the connection portion 72 of the negative terminal 70 is connected to this gathered, exposed portion (by welding, for example).

The material for and the members constituting the electrode unit 80 may be similar to those for common lithium-ion batteries, and there is no particular limitation thereto. For example, aluminum foil or other metallic foil suitable for positive electrodes may be used for the positive current collector. One or more kinds of materials that are used for common lithium-ion batteries may be used as the positive electrode active material without particular limitations. Examples of such a material include lithium transition-metal oxide, such as $LiMn_2O_4$, $LiCoO_2$ and $LiNiO_2$. On the other hand, copper foil or other metallic foil suitable for negative electrodes may be used for the negative current collector. One or more kinds of materials that are used for common lithium-ion batteries may be used as the negative electrode active material without particular limitations. Examples of such a material include carbon-based material, such as graphite and amorphous carbon, lithium transition-metal oxide, and transition metal nitride. Examples of the separator sheets that are interposed between the positive and negative sheets include one made of porous, polyolefin-based resin. The electrode unit contained in the case in the technology described herein is not limited to the rolled type electrode unit as described above. For example, a layered type electrode unit, which is formed by alternately layering a plurality of positive sheets and a plurality of negative sheets with a separator sheet interposed at each interface between the positive and negative sheets.

As the electrolyte contained in the case 20 along with the electrode unit 80, a fluid electrolyte (electrolytic solution) that is also used in common lithium-ion batteries may be used, for example. The composition of such electrolytic solution may be one obtained by mixing lithium salt, such as $LiPF_6$, as supporting electrolyte into appropriate non-aqueous solvent, such as a mixed solvent of diethyl carbonate and ethylene carbonate. A solid electrolyte or gel electrolyte may be used as the electrolyte. When a solid electrolyte or gel electrolyte is used as the electrolyte, there can be a case where no separator is needed (that is, the electrolyte itself also functions as the separator).

Figure 6:
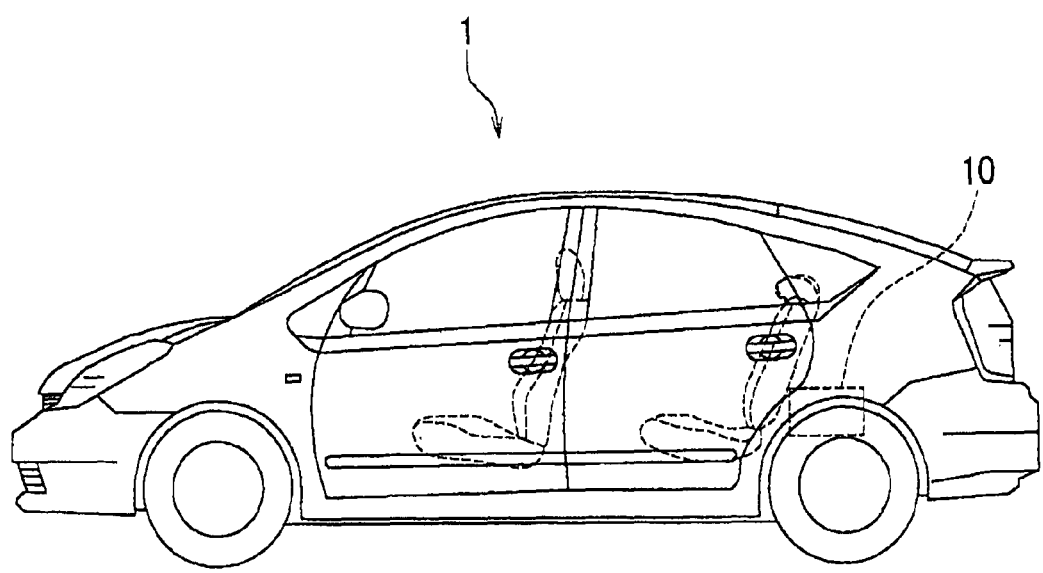
FIG. 6 is a side view schematically showing a vehicle according to an embodiment.

The battery cell 2 and the power supply, such as the battery pack 10, constructed using such battery cells described herein can be used as a power supply for a motor mounted on a vehicle, such as an automobile, in particular. Thus, according to the invention, a vehicle 1 is provided, which is in particular an automobile, such as a hybrid vehicle, a pure electric vehicle and a fuel cell vehicle, provided with a motor as a motive-power generating device, the vehicle 1 being provided with the battery pack (power supply) 10 as a power source formed by connecting a plurality of the battery cells 2 in series with the bus bars 3 that are welded to the exposed portions 68 and 78 of the lithium-ion battery cells 2, as schematically shown in FIG. 6, for example.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

For example, although constructions and functions of the battery cell according to the invention have been described with respect to the lithium-ion battery cell 2 including the rectangular (box-shaped) container by way of example, the invention can be applied to various batteries that use different electrolytes and different materials for the electrode unit, such as lithium secondary batteries, in which lithium or lithium alloy is used for the negative electrode, nickel-hydrogen batteries, and nickel-cadmium batteries, or to electric double-layer capacitors, which convert physical energy into electric energy.

The invention claimed is:

1. A battery cell comprising:
a case including a lid member having an upper surface, the lid member having a hole;
an electrode unit contained in the case;
an insulating member fitted into the hole; and
an electrode terminal, one end of which is connected to the electrode unit, and the other end of which is passed through the insulating member and is extended out of the case through the hole, wherein:
the electrode terminal has an exposed portion that is further extended out of the insulating member outside the case;
the insulating member includes: a first insulating portion interposed between the electrode terminal and the hole, and a second insulating portion formed along a surface of the electrode terminal that is extended out of the case through the hole;
the insulating member further includes a third insulating portion that is provided between the first insulating portion and the second insulating portion;
a recess is formed in a top surface of the third insulating portion; and
the top surface of the third insulating portion faces in substantially the same direction as the upper surface of the lid member.

2. The battery cell according to claim 1, wherein the first insulating portion isolates the electrode terminal from an inner surface of the hole and closes an interface between the inner surface and the electrode terminal.

3. The battery cell according to claim 1, wherein the recess is formed along an outer periphery of the top surface of the third insulating portion, and, when the second insulating portion melts, the recess prevents outflow of a melt of the second insulating portion.

4. The battery cell according to claim 1, wherein the recess is formed so as to have a volume equal to or greater than a volume of the second insulating portion.

5. The battery cell according to claim 1, wherein the second and third insulating portions are integrally formed.

6. The battery cell according to claim 1, wherein, of members constituting the case, at least a member in which the hole is formed is made of metal.

7. The battery cell according to claim 1, wherein at least a portion of the electrode terminal from a portion passed through the insulating member to the exposed portion is made of copper.

8. The battery cell according to claim 1, wherein the insulating member contains a resin selected from a group consisting of polyphenylene sulfide, polyimide, polyamideimide, fluoroplastic, polyetheretherketone, and polyethersulfone.

9. The battery cell according to claim 1, wherein the insulating member is made of a resin whose melting point is equal to or greater than 200° C.

10. A power supply constructed using a plurality of the battery cells according to claim 1, wherein the power supply is formed by welding a metallic member to the exposed portion.

11. The power supply according to claim 10, wherein the plurality of battery cells are electrically connected by welding one end and the other end of the metallic member to respective electrode terminals of adjacent two of the plurality of battery cells.

12. The power supply according to claim 10, wherein the volume of the second insulating portion is set based on a distance from a welded portion between the exposed portion and the metallic member to a top end of the second insulating portion and on a volume of a welded object that is melted to perform welding.

13. A vehicle provided with the power supply according to claim 10.

14. The battery cell according to claim 1, wherein the top surface of the third insulating portion is located in a plane substantially parallel to a longitudinal axis of the lid member.

15. The battery cell according to claim 1, wherein a diameter of the third insulating portion is greater than a diameter of the first and second insulating portions.

16. The battery cell according to claim 1, wherein the recess is formed slightly spaced apart from a base portion of the second insulating portion.

17. The battery cell according to claim 1, wherein the recess is formed directly adjacent to a base portion of the second insulating portion.

* * * * *